US012565037B2

(12) United States Patent
Tokuda et al.

(10) Patent No.: US 12,565,037 B2
(45) Date of Patent: Mar. 3, 2026

(54) FLEXIBLE ELECTRIC WIRING BOARD AND PRINT HEAD

(71) Applicant: CANON KABUSHIKI KAISHA, Tokyo (JP)

(72) Inventors: Takamitsu Tokuda, Kanagawa (JP); Shingo Okushima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 207 days.

(21) Appl. No.: 18/128,002

(22) Filed: Mar. 29, 2023

(65) Prior Publication Data

US 2023/0311486 A1 Oct. 5, 2023

(30) Foreign Application Priority Data

Mar. 30, 2022 (JP) ................................ 2022-056136

(51) Int. Cl.
*B41J 2/045* (2006.01)
*B41J 2/14* (2006.01)

(52) U.S. Cl.
CPC ....... *B41J 2/04541* (2013.01); *B41J 2/14201* (2013.01); *B41J 2002/14491* (2013.01)

(58) Field of Classification Search
CPC .................................................... B41J 2/04568
See application file for complete search history.

(56) References Cited

U.S. PATENT DOCUMENTS 11,345,143 B2 5/2022 Yamada
2011/0122199 A1* 5/2011 Takemoto ............ B41J 2/14233 347/48
2012/0229541 A1* 9/2012 Satoh .................. B41J 2/04581 347/10
2018/0146551 A1* 5/2018 Kida ...................... H05K 3/361
2018/0178511 A1* 6/2018 Kashimura .......... B41J 2/14233
2019/0232655 A1* 8/2019 Kondo ................... B41J 2/1623
2023/0311495 A1* 10/2023 Morita ................. B41J 2/14233 347/10

FOREIGN PATENT DOCUMENTS

JP 2021-8043 A 1/2021

* cited by examiner

*Primary Examiner* — Shelby L Fidler
(74) *Attorney, Agent, or Firm* — Venable LLP

(57) ABSTRACT

In order to reduce a width of a flexible electric wiring board and to downsize a print head, a flexible electric wiring board including: is provided with a selection unit configured to select one type of a drive signal out of a plurality of types of drive signals for driving a piezoelectric element; a plurality of drive signal lines including drive signal lines to transmit the plurality of types of the drive signals to the selection unit, respectively; and a control signal line configured to transmit a control signal to the selection unit in order to select the one type of the drive signal, in which the plurality of types of the drive signal lines have mutually different line widths.

13 Claims, 18 Drawing Sheets

FIG.9
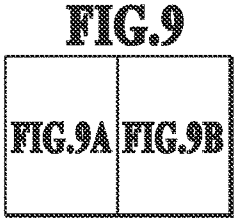
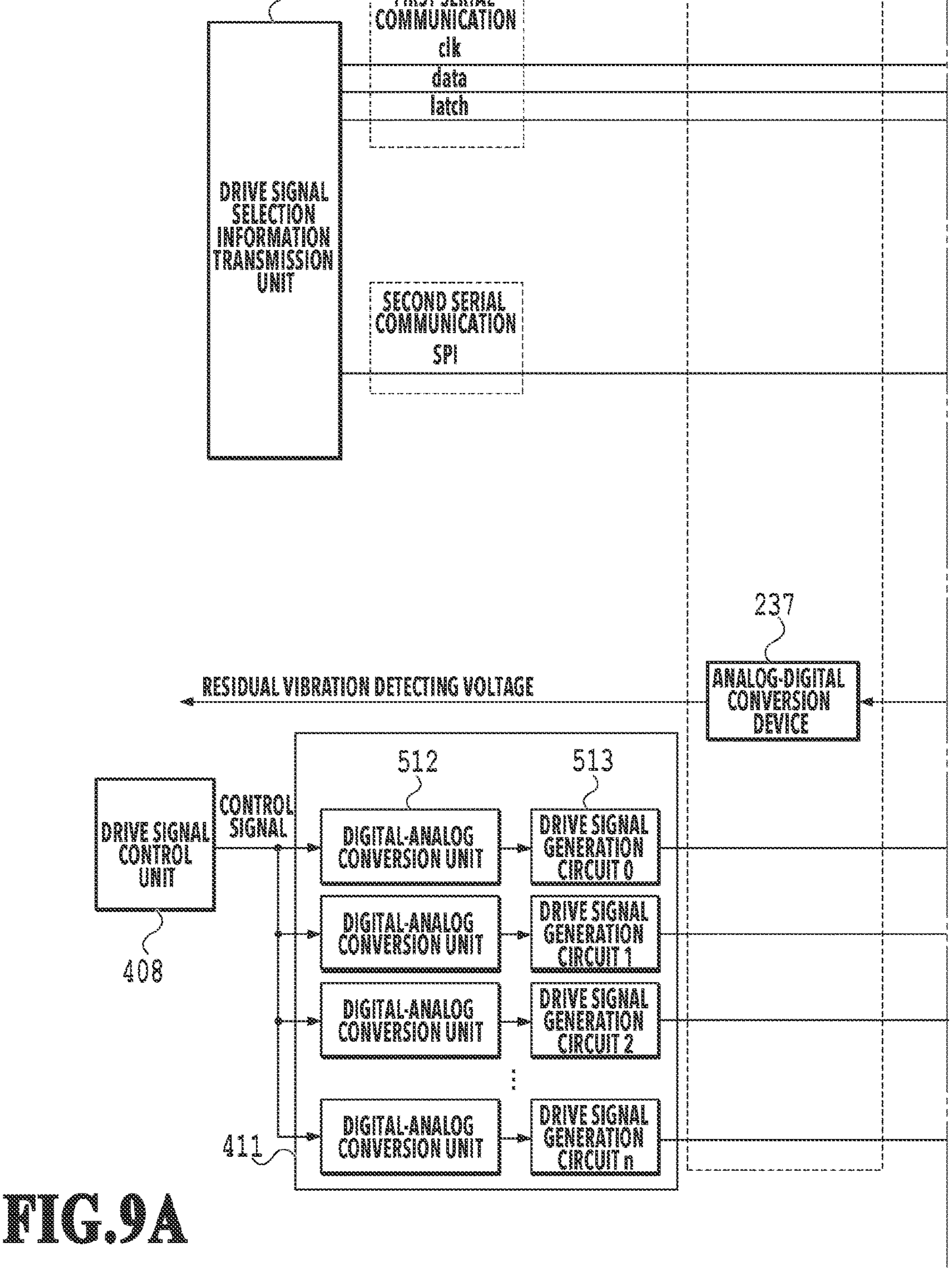
FIG.9A

FLEXIBLE ELECTRIC WIRING BOARD AND PRINT HEAD

BACKGROUND

Field

The present disclosure relates to a technique for a flexible electric wiring board used in a printing apparatus such as an ink jet printer.

Description of the Related Art

Japanese Patent Laid-Open No. 2021-8043 discloses a liquid ejecting apparatus that includes a drive signal line that propagates a first drive signal, and a drive signal line that propagates a second drive signal. In a case where there are two or more types of drive signals as mentioned above, it is a general practice to prepare two or more drive signal lines for propagating these signals. Meanwhile, as for the drive signal lines, it is necessary to prepare drive signal lines each having such a line width that can feed a maximum drive current corresponding to a maximum number of elements so as to be able to drive piezoelectric elements in the maximum number of elements that can be simultaneously driven.

SUMMARY

However, the number of drive signal lines to be deployed on the flexible electric wiring board is increased in a case where types of the drive signals used therein are increased to three or more types, for example. Such an increase may lead to expansion of the width of the flexible electric wiring board and may result in an increase in size of a print head.

In view of the aforementioned problem, an object of the present disclosure is to reduce a width of a flexible electric wiring board and to downsize a print head.

An aspect of the present disclosure provides a flexible electric wiring board including: a selection unit configured to select one type of a drive signal out of a plurality of types of drive signals for driving a piezoelectric element; a plurality of drive signal lines including drive signal lines to transmit the plurality of types of the drive signals to the selection unit, respectively; and a control signal line configured to transmit a control signal to the selection unit in order to select the one type of the drive signal, in which the plurality of types of the drive signal lines have mutually different line widths.

According to the present disclosure, it is possible to reduce a width of a flexible electric wiring board and to downsize a print head.

Further features of the present disclosure will become apparent from the following description of exemplary embodiments with reference to the attached drawings.

BRIEF DESCRIPTION OF THE DRAWINGS

FIG. 9 is a diagram showing a relationship between FIGS. 9A and 9B;

FIGS. 9A and 9B constitute a diagram showing a configuration and an operation of a drive signal selection unit;

DESCRIPTION OF THE EMBODIMENTS

A preferred embodiment of the present disclosure will be described below in detail with reference to the accompanying drawings. Throughout the drawings, the same reference signs denote the same or equivalent elements unless otherwise specifically stated. It is to be also noted that the characteristic features described below are not intended to unnecessarily limit the disclosure according to the appended claims, and that the entire combination of those features is not always essential for a solution of the present disclosure.

<Overall Configuration of Ink Jet Printing Apparatus>

Figure 1:
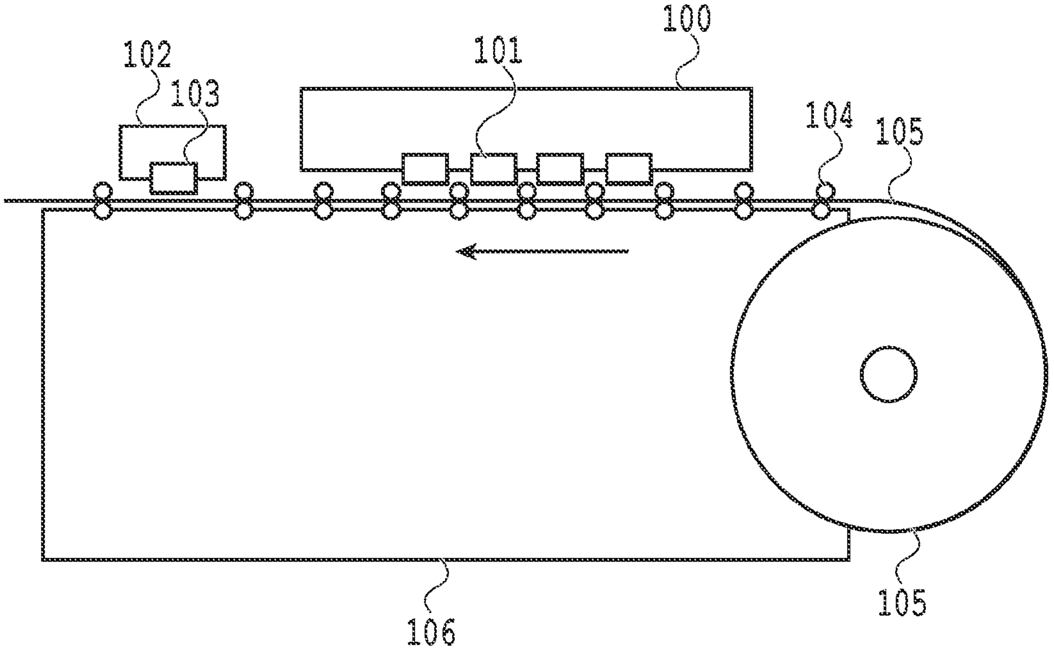
FIG. 1 is a schematic diagram showing an overall configuration of an ink jet printing apparatus.

FIG. 1 is a side sectional view showing a configuration of a printing apparatus as an example of an ink jet printing apparatus, which is configured to print on a rolled print medium such as rolled paper by using a full-line ink jet print head.

The full-line ink jet print head (hereinafter simply referred to as the "print head") is a print head which has a print width equal to or above a length in a width direction of the rolled paper.

The printing apparatus is mainly formed from a housing 106, a head unit 100, first to fourth print heads 101 corresponding to four colors as typified by cyan (C), magenta (M), yellow (Y), and black (B), a scanner unit 102, a line scanner 103, and transportation rollers 104.

Rolled paper 105 used as the print medium is nipped by pairs of the transportation rollers 104 and transported in a direction indicated with an arrow, thus being subjected to sequential printing at respective locations immediately below the first to fourth print heads 101.

<Configuration of Print Head>

A piezoelectric element functioning as an ejection energy generation element serves as a unit for ejecting an ink from each nozzle of the print head 101. There has been known a method of generating pressure inside a pressure chamber by using the piezoelectric element, and ejecting a liquid inside the pressure chamber from a nozzle formed in one end of the pressure chamber by using the pressure. In the above-described print head 101, each piezoelectric element is provided with an electric contact connected to an integrated circuit that generates a drive signal. Here, ejection is carried out by driving the piezoelectric element with the drive signal.

Figure 2:
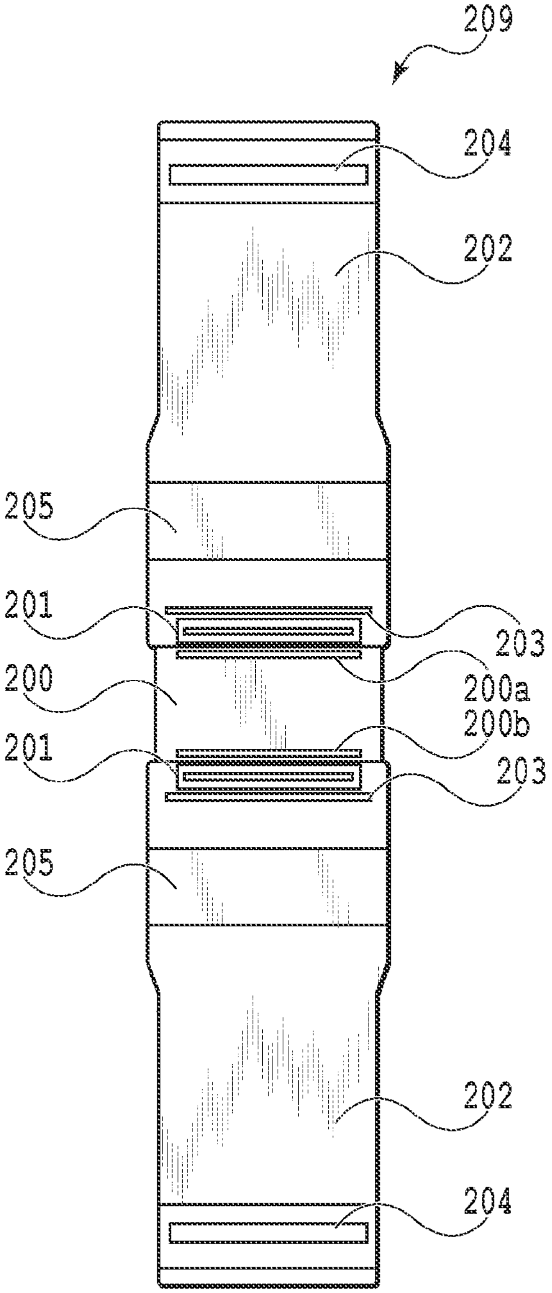
FIG. 2 is a schematic diagram showing a chip unit that constitutes an ink jet print head.

FIG. 2 is a schematic diagram of a chip unit 209, which is formed by assembling a piezoelectric element board 200, drive signal selection units 201, and flexible electric wiring boards 202 together. The piezoelectric element board 200 includes a first terminal 200*a* and a second terminal 200*b*, which are electrically connected, respectively, to not-illustrated terminals provided to drive signal selection units 201 that are mounted on the flexible electric wiring boards 202. Each flexible electric wiring board 202 includes a selection unit side terminal 203, which is electrically connected to a not-illustrated wiring board side terminal provided to the corresponding drive signal selection unit 201.

Each flexible electric wiring board 202 includes a capacitor mounting unit 205 to mount a power supply bypass capacitor of the drive signal selection unit 201, and a head board connector 204 to be connected to a not-illustrated head board.

Figure 3:
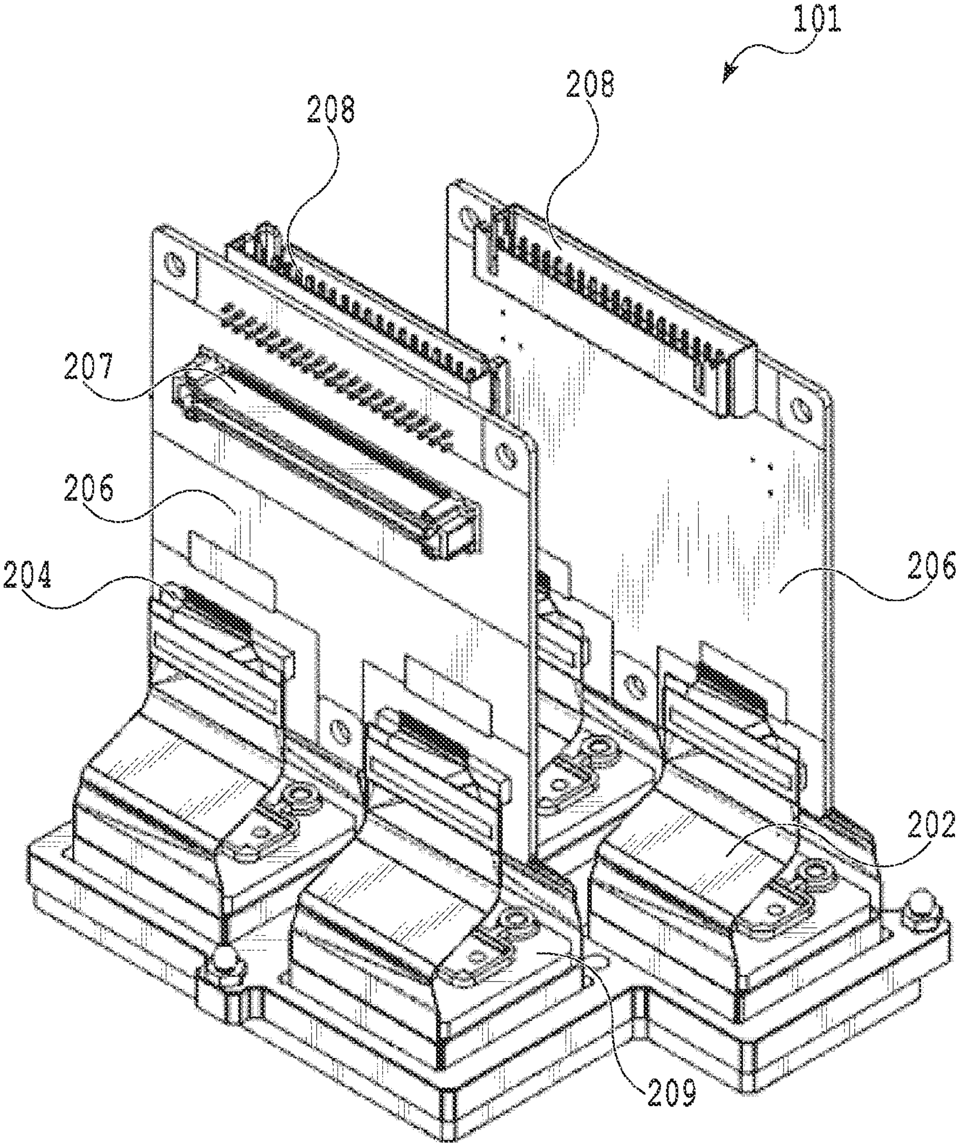
FIG. 3 is a perspective view showing the ink jet print head.

FIG. 3 is a schematic diagram of the print head 101. Each head is formed from four chip units 209. Each chip unit 209 is electrically connected to ahead board 206 by using the head board connector 204. The head board 206 includes a signal connector 207 and a drive signal connector 208, which are connected to a printing apparatus body.

Figure 4:
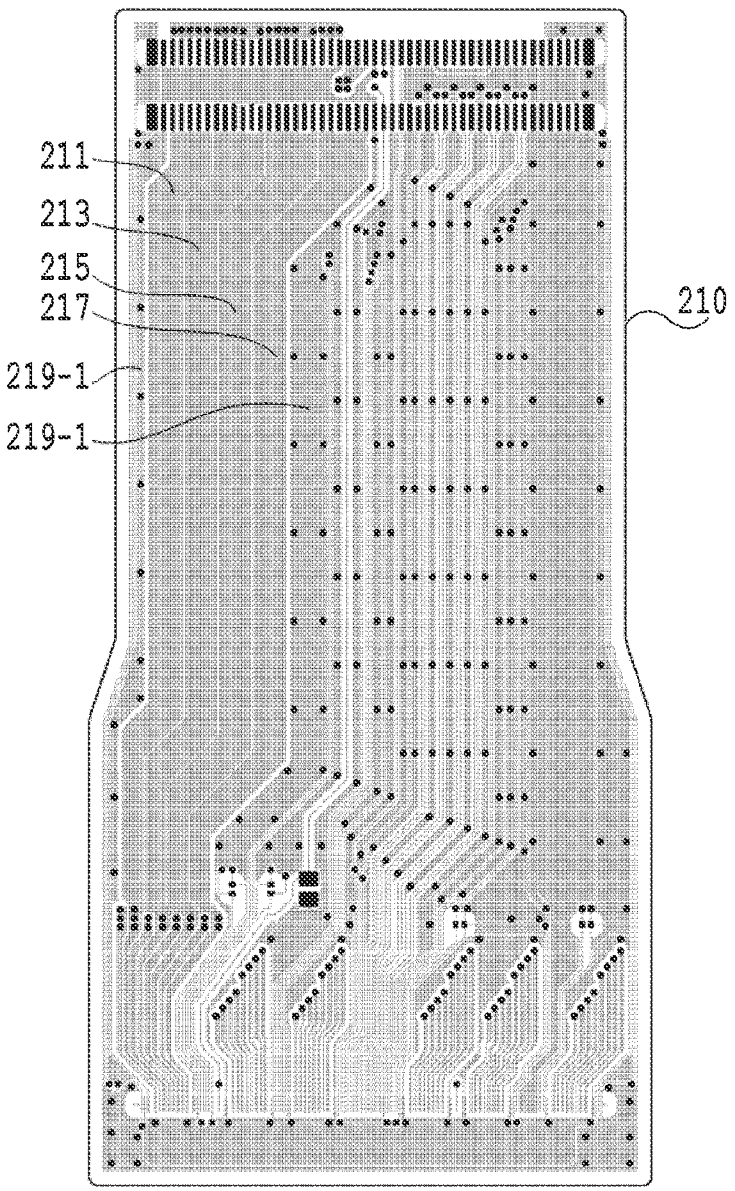
FIG. 4 is a schematic diagram showing lines in the ink jet print head.

FIG. 4 shows lines on a first layer of a flexible electric wiring board 210 (corresponding to the flexible electric wiring board 202 in FIG. 3). Regarding a first drive signal line 211, a third drive signal line 213, a fifth drive signal line 215, and a seventh drive signal line 217, these lines have substantially the same line width. A drive signal feedback current line 219-1 is disposed on an opposite side from the third drive signal line 213 with respect to the first drive signal line 211. Meanwhile, another drive signal feedback current line 219-1 is also disposed on an opposite side from the fifth drive signal line 215 with respect to the seventh drive signal line 217.

Figure 5:
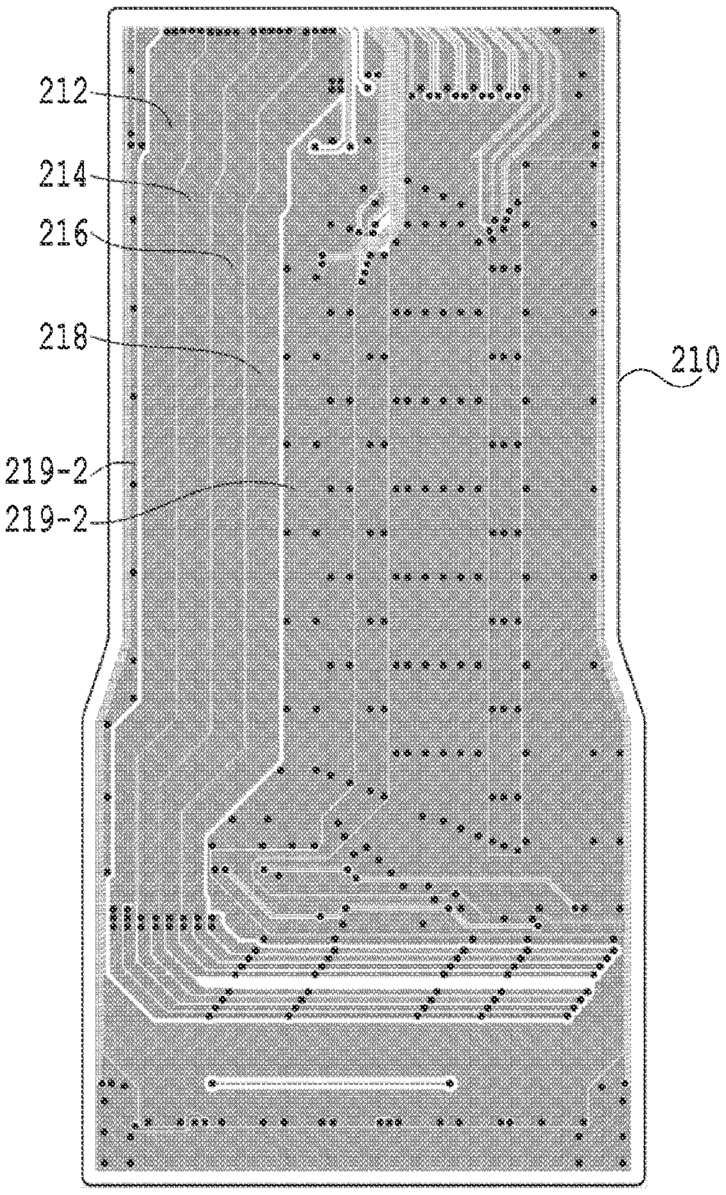
FIG. 5 is a schematic diagram showing more lines in the ink jet print head.

FIG. 5 shows lines on a second layer of the flexible electric wiring board 210. Regarding a second drive signal line 212, a fourth drive signal line 214, a sixth drive signal line 216, and an eighth drive signal line 218, these lines have substantially the same line width. A drive signal feedback current line 219-2 is disposed on an opposite side from the fourth drive signal line 214 with respect to the second drive signal line 212. Meanwhile, another drive signal feedback current line 219-2 is also disposed on an opposite side from the sixth drive signal line 216 with respect to the eighth drive signal line 218.

<Method of Driving Piezoelectric Element and Drive Signal for Piezoelectric Element>

Figure 6A:
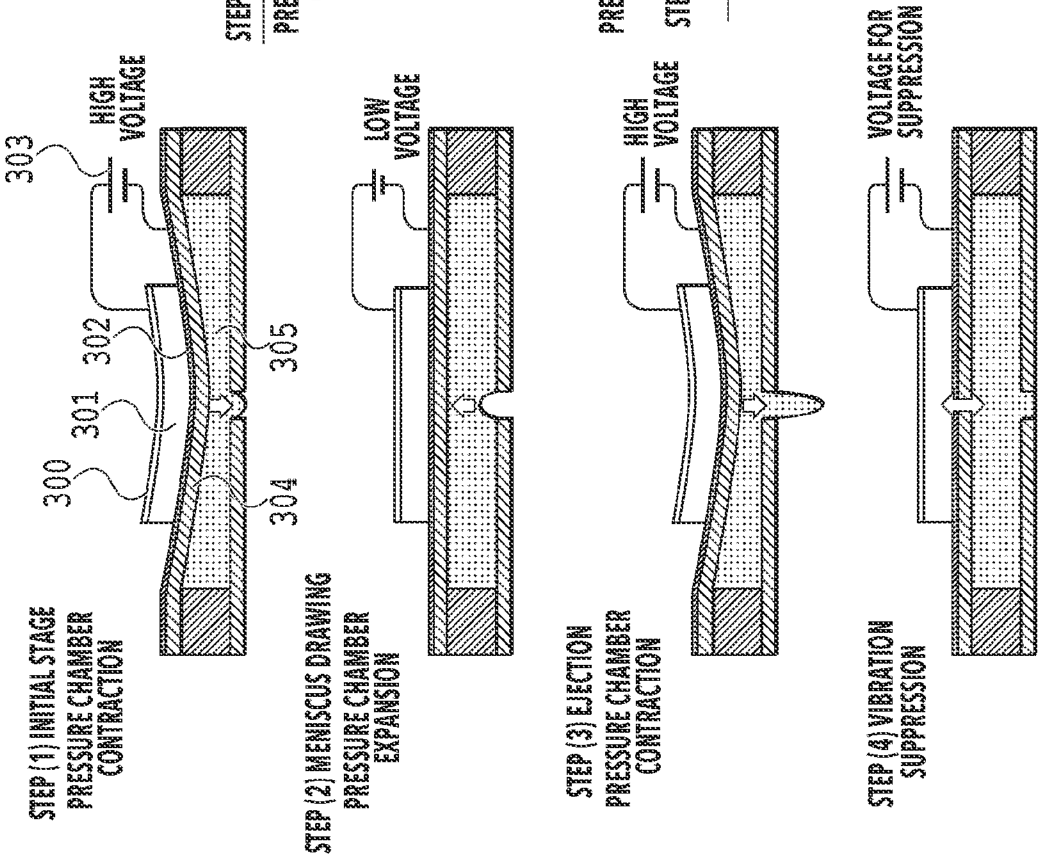
FIGS. 6A and 6B are diagrams showing a method of driving a piezoelectric element and a drive signal for the piezoelectric element.
Figure 6B:
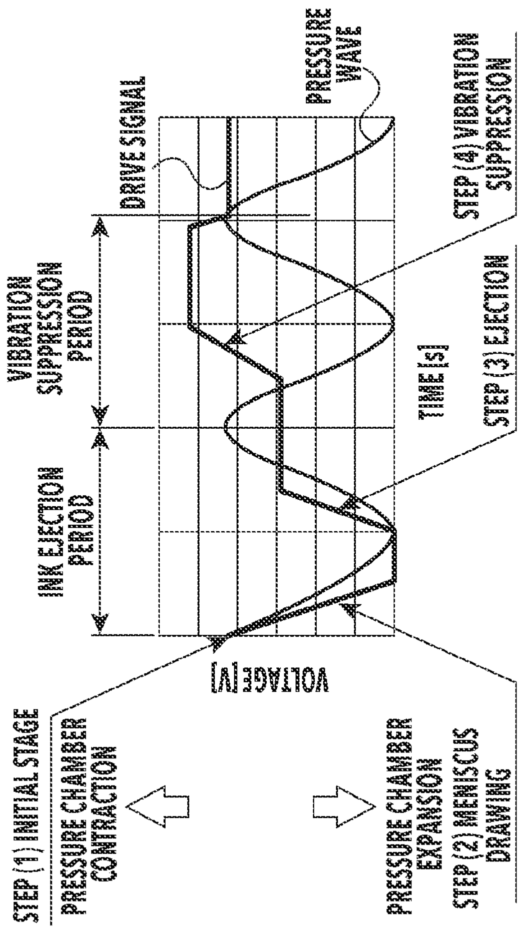

A method of driving a piezoelectric element 301 and a drive signal to be applied to the piezoelectric element 301 will be described with reference to FIGS. 6A and 6B. The following four steps of step (1) to step (4) are required for driving the piezoelectric element 301. These steps will be sequentially described below.

Step (1): A pressure chamber 304 is filled with an ink 305 in an initial state. A voltage source 303 applies a high voltage between an upper electrode 300 and a lower electrode 302 of the piezoelectric element 301, and the pressure chamber 304 is contracted.

Step (2): The pressure chamber 304 is expanded by lowering the voltage from the voltage source 303. Thus, the ink 305 is drawn into the pressure chamber 304. In this instance, a sinusoidal pressure wave is generated in the pressure chamber 304 by the piezoelectric element 301.

Step (3): The voltage from the voltage source 303 is raised synchronously with the pressure wave generated in step (2), thereby contracting the pressure chamber 304 and ejecting the ink 305.

Step (4): After step (3), the piezoelectric element 301 continues mechanical vibration. In order to immobilize the piezoelectric element 301 by cancelling this mechanical vibration, the voltage from the voltage source 303 is raised again.

The series of operations from step (1) to step (4) described above forms one session of an ejecting operation. Meanwhile, a series of changes in voltage from the voltage source 303 from step (1) to step (4) forms a drive signal waveform to be applied to the piezoelectric element 301.

<Configuration of Ink Jet Printing Apparatus>

Figure 7:
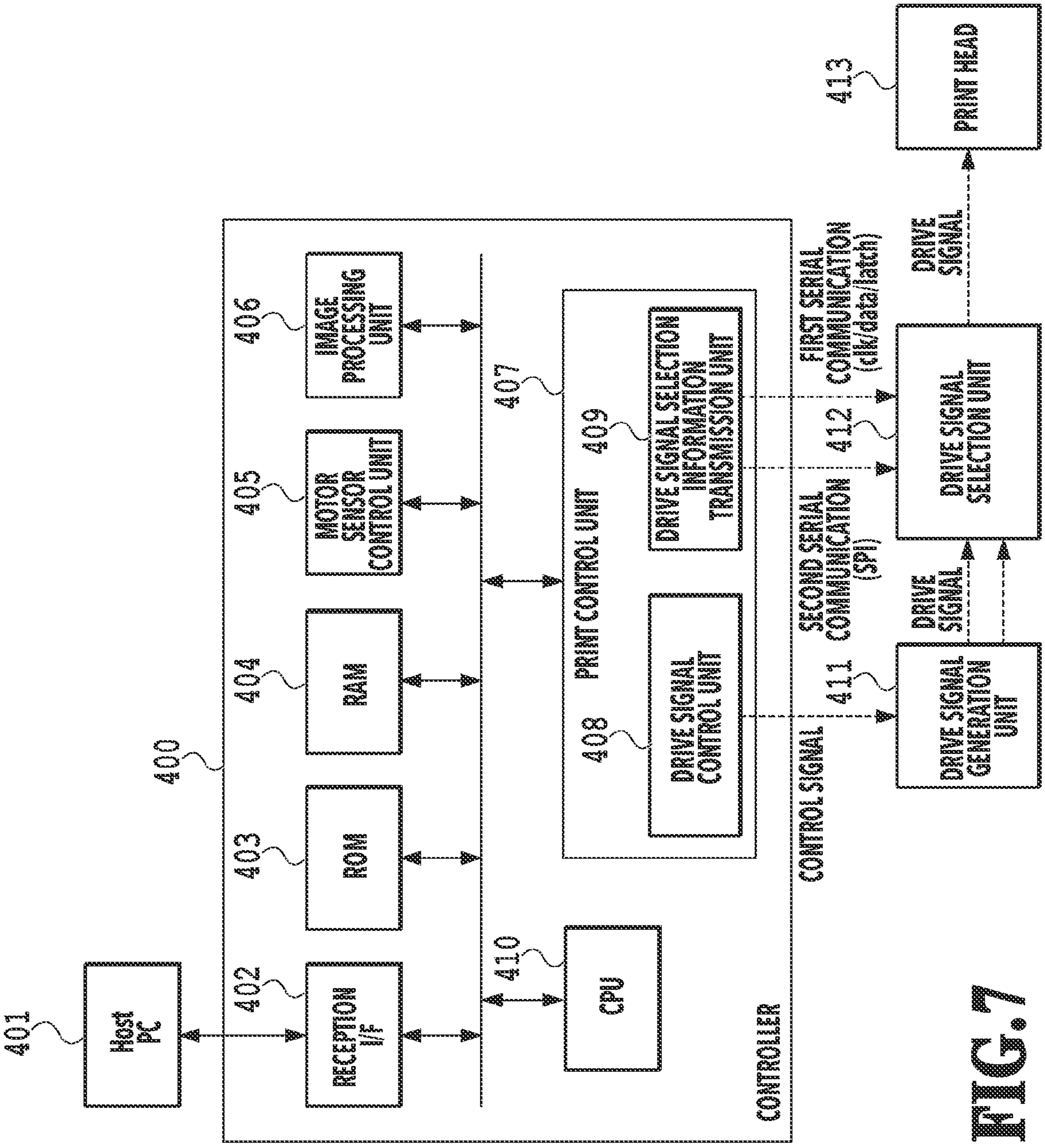
FIG. 7 is a block diagram showing a configuration of the ink jet printing apparatus.

A configuration of the ink jet printing apparatus will be described. FIG. 7 is a block diagram showing the configuration of the ink jet printing apparatus. A host PC 401 sends a controller 400 a print instruction and a print job that includes image data for printing and print setting information. The controller 400 that controls the ink jet printing apparatus includes a reception IF 402, a ROM 403, a RAM 404, a motor sensor control unit 405, an image processing unit 406, a print control unit 407, and a CPU 410.

The reception O/F 402 transmits and receives data to and from the host PC 401. The ROM 403 stores programs to operate the CPU 410. The RAM 404 is used for executing the programs, and temporarily stores various data. The motor sensor control unit 405 controls a motor and a sensor inside the ink jet printing apparatus. The image processing unit 406 performs image processing on image data included in a print job sent from the host PC 401 through the reception I/F 402. To be more precise, the image processing unit 406 generates raster image data in a bitmap format based on the image data included in the print job received from the host PC 401 and expressed in a page description language, for example. In addition, the image processing unit 406 converts the generated image data into sets of image data for the respective ink colors as typified by CMYK which can be processed by the print control unit 407, and outputs the converted image data. The print control unit 407 performs print control of a print head 413 (corresponding to the print head 101 in FIG. 1) based on the image data outputted as a consequence of the image processing by the image processing unit 406.

The print control unit 407 includes a drive signal control unit 408 and a drive signal selection information transmission unit 409. The drive signal control unit 408 transmits a control signal for generating a drive signal to a drive signal generation unit 411. The drive signal selection information transmission unit 409 transmits drive signal selection information to a drive signal selection unit 412 (corresponding to the drive signal selection unit 201 in FIG. 2) by means of serial communication (hereinafter referred to as first serial communication) that uses prescribed transmission lines. The serial communication means a communication method configured to continuously transmit and receive data one bit by one bit while using one or two transmission lines for transmitting and receiving the data.

The drive signal generation unit 411 outputs two or more drive signals to the drive signal selection unit 412 based on the control signal transmitted from the drive signal control unit 408. The present embodiment will explain a case where the drive signals include three types of drive signals (large ink droplet size, small ink droplet size, no ink droplet ejection). Details of the drive signals will be described later (see FIG. 11 and the like).

Based on the drive signal selection information transmitted from the drive signal selection information transmission unit 409, the drive signal selection unit 412 selects a unique drive signal out of the drive signals transmitted from the drive signal generation unit 411. The drive signal selected by the drive signal selection unit 412 is inputted to the piezoelectric element 301 corresponding to a nozzle in a print head unit. In the case where the voltage having the drive signal waveform is applied to the electrodes of the piezoelectric element 301, the piezoelectric element 301 between the electrodes is displaced and the ink is ejected by using energy generated by the displacement.

According to the first serial communication described above, connection between the drive signal selection information transmission unit 409 and the drive signal selection unit 412 is established and a clk signal, a data signal, and a latch signal are transmitted. To be more precise, information is contained in the data signal which is transmitted synchronously with the clk, and the information is transmitted on the basis of the latch signal.

Connection between the drive signal selection information transmission unit 409 and the drive signal selection unit 412 is also established by second serial communication that uses transmission lines different from those used in the first serial communication. The second serial communication is used for carrying out setting inside the drive signal selection unit 412. In the present embodiment, the second serial communication adopts a communication protocol that is widely known in general such as the Serial Peripheral Interface (SPI). However, the communication method is not limited to this method.

The print head 413 is formed from nozzles (also referred to as ejection holes) each having a mechanism to eject the ink, and the piezoelectric elements 301 corresponding to the nozzles. The ink is ejected from each nozzle by inputting the drive signal to the piezoelectric element 301 corresponding to the nozzle. The following description will discuss an example of the print head 413 including 128 nozzles and the piezoelectric elements 301 corresponding one-to-one to the nozzles unless otherwise specifically stated. However, the number of the nozzles may be any number as long as it is an integer equal to or more than two.

Figure 8:
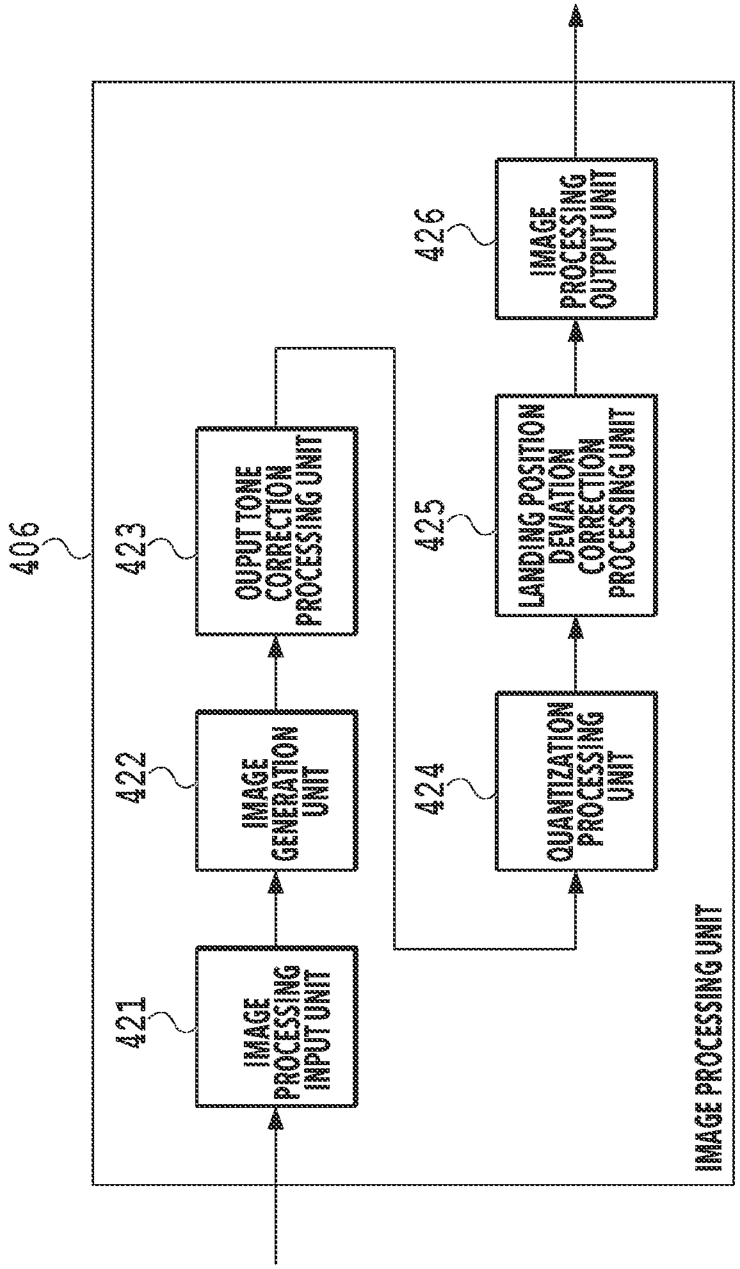
FIG. 8 is a block diagram showing a configuration of an image processing unit.

FIG. 8 is a block diagram showing a detailed structure of the image processing unit 406 in FIG. 7. An instruction from the CPU 410 to the image processing unit 406 is carried out by writing an appropriate value into a not-illustrated register unit.

An image processing input unit 421 takes in the image data included in the print job from the RAM 404 based on the instruction of the CPU 410, and outputs the image data to an image generation unit 422. The image generation unit 422 converts the received image data into a set of four-channel image data corresponding to CMYK having such resolutions that can be printed with the print head 413, and outputs the converted image data to an output tone correction processing unit 423. The output tone correction processing unit 423 conducts correction processing that corresponds to output characteristics of the inks. A quantization processing unit 424 performs processing to convert the data having an 8-bit to 16-bit tone range into data having the number of tones that can be expressed with the nozzles of the print head. In general, the original data is converted into N values by using an error diffusion method, a dither method, and the like, thereby converting the data into image data having a 1-bit to 4-bit tone range. A landing position deviation correction processing unit 425 shifts the data for each pixel so as to correct a landing position deviation of each nozzle on the basis of a resolution of the image. An image processing output unit 426 carries out processing to output the image data subjected to the above-described processing to the RAM 404. This image data is stored in the RAM 404.

<Drive Signal Selection Unit>

The drive signal selection unit 412 shown in FIG. 7 will be described with reference to FIGS. 9A and 9B. A serial-parallel conversion unit 506 receives the data transmitted from the drive signal selection information transmission unit 409 by way of the first serial communication, and the received data is retained by a data latch 507 while defining input timing of the latch signal as a starting point. The retained drive signal selection information is inputted to a decoder 509.

The drive signal generation unit 411 is formed from digital-analog conversion units 512 and drive signal generation circuits 513. Each digital-analog conversion unit 512 receives the control signal from the drive signal control unit 408. Each drive signal generation circuit 513 that receives an analog signal outputted from the corresponding digital-analog conversion unit generates a drive signal.

The generated drive signal is inputted to a switch group 510 in the drive signal selection unit 412. The switch group 510 is formed from switches SWx-y (in which x corresponds to a nozzle number for identifying the nozzle while y corresponds to a drive signal number for identifying the drive signal). The switch group 510 selects a drive signal from multiple drive signals in accordance with the control signal based on decoding information of the decoder 509, and drives the piezoelectric element 301 corresponding to the nozzle. As described above, the print head 413 of the present embodiment is assumed to be formed from a nozzle group 503 including 128 nozzles, and the piezoelectric elements 301 corresponding to the respective nozzles. There are the decoders 509 and the switch groups 510 as many as the number of the nozzles.

<First Serial Communication>

Figure 10:
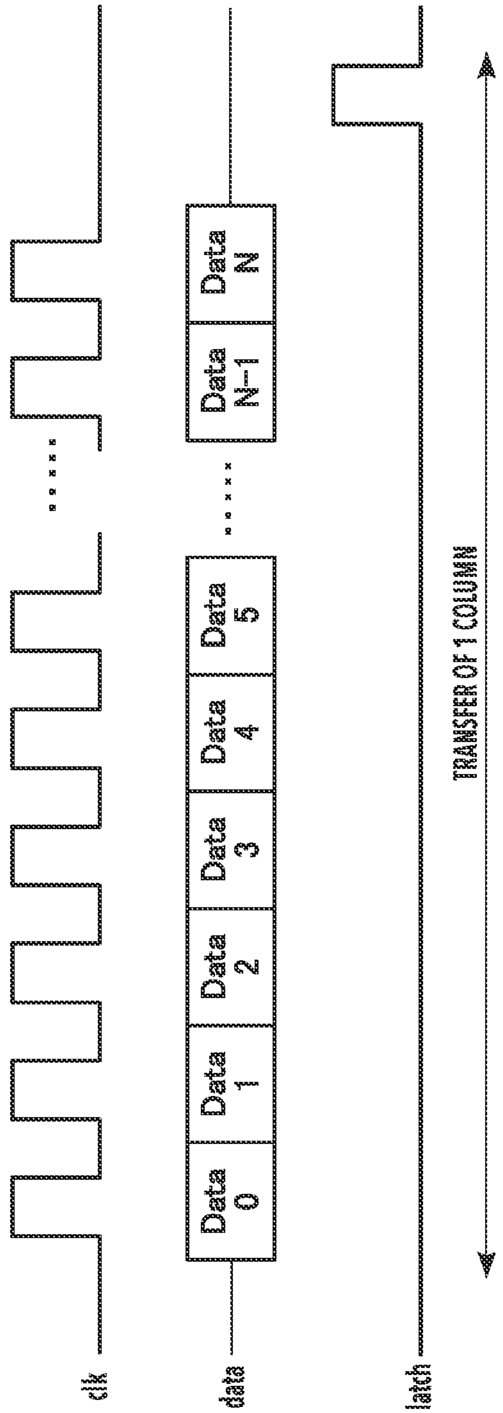
FIG. 10 is a diagram showing first serial communication.

FIG. 10 shows contents of a signal transmitted from the drive signal selection information transmission unit 409 by way of the first serial communication. As shown in FIG. 10, the data signal is transmitted synchronously with the clk signal. The latch signal indicates an end of one session of transmission.

The data signal need not be transmitted on one line. The number of lines of the data signal may be increased in consideration of a balance with a frequency of the clk signal so as to be able to perform ejection at a predetermined ink ejection frequency. Here, the “ink ejection frequency” represents the number of times of ejection of ink droplets from the print head in each second.

In the present disclosure, the communication is carried out such that data corresponding to one column, or more specifically, data corresponding to a product of the number of nozzles—an amount of the drive signal selection information (that is, the number of types of the drive signals) can be transmitted in a period from a certain latch signal to a subsequent latch signal. For example, in the case where there are four types of the drive signals and the number of the nozzles is 128, the data corresponding to 128×2 bits (which means selection from the four types of the signals) is transmitted in the period between the latch signals. On the other hand, in the case where there is a switch (to be described later in detail) for detecting residual vibration in addition to the four types of the drive signals, a sum of the number of types of the drive signals and the number of the switches for detecting the residual vibration is equal to five (=4+1). Accordingly, data corresponding to 128×3 bits (in order to select one out of the five conditions) needs to be transmitted in the period between the latch signals.

<Timing Chart for Drive Signal Selection Unit>

Figure 11:
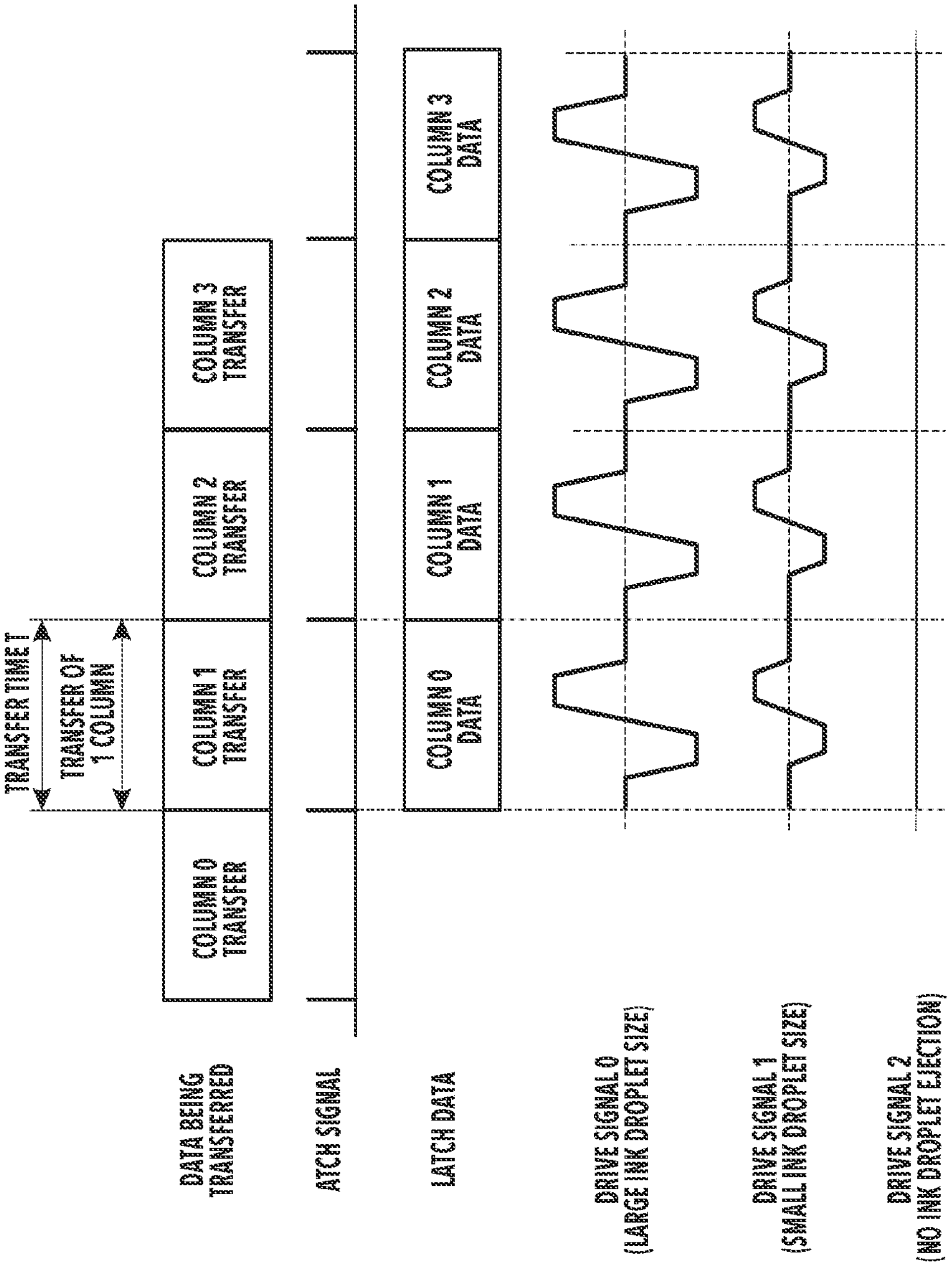
FIG. 11 is a timing chart of the drive signal selection unit.

A timing chart for the drive signal selection unit will be described with reference to FIG. 11. FIG. 11 depicts a relation between the drive signal and the data transmitted by way of the first serial communication. The drive signal selection information corresponding to one column is transferred in a predetermined drive period between a certain latch signal and a subsequent latch signal. The received data is retained by the data latch 507 (see FIGS. 9A and 9B) while defining a point of reception of the latch signal as a starting point. Moreover, one of the multiple types of the drive signals is selected for each nozzle based on the data retained by the data latch 507, and the selected signal is transmitted to the piezoelectric element 301 corresponding to the nozzle. For example, three types of the drive signals are assumed in the case shown in FIG. 11. Accordingly, there are three drive signal generation circuits (513-0, 513-1, and 513-2) in FIGS. 9A and 9B in this case. The drive signals that can realize desired conditions of the ink droplets, such as the large ink droplet size, the small ink droplet size, and no ink droplet ejection are assumed to be allocated to these three drive signal generation circuits 513, and the drive signal generation circuits 513 are assumed to be used accordingly. Here, as shown in FIG. 11, a drive signal for realizing the condition of the large ink droplet size will be defined as a "drive signal 0", a drive signal for realizing the condition of the small ink droplet size will be defined as a "drive signal 1", and a drive signal for realizing the condition no ink droplet injection will be defined as a "drive signal 2".

<Residual Vibration Detecting Circuit>

Figure 9B:
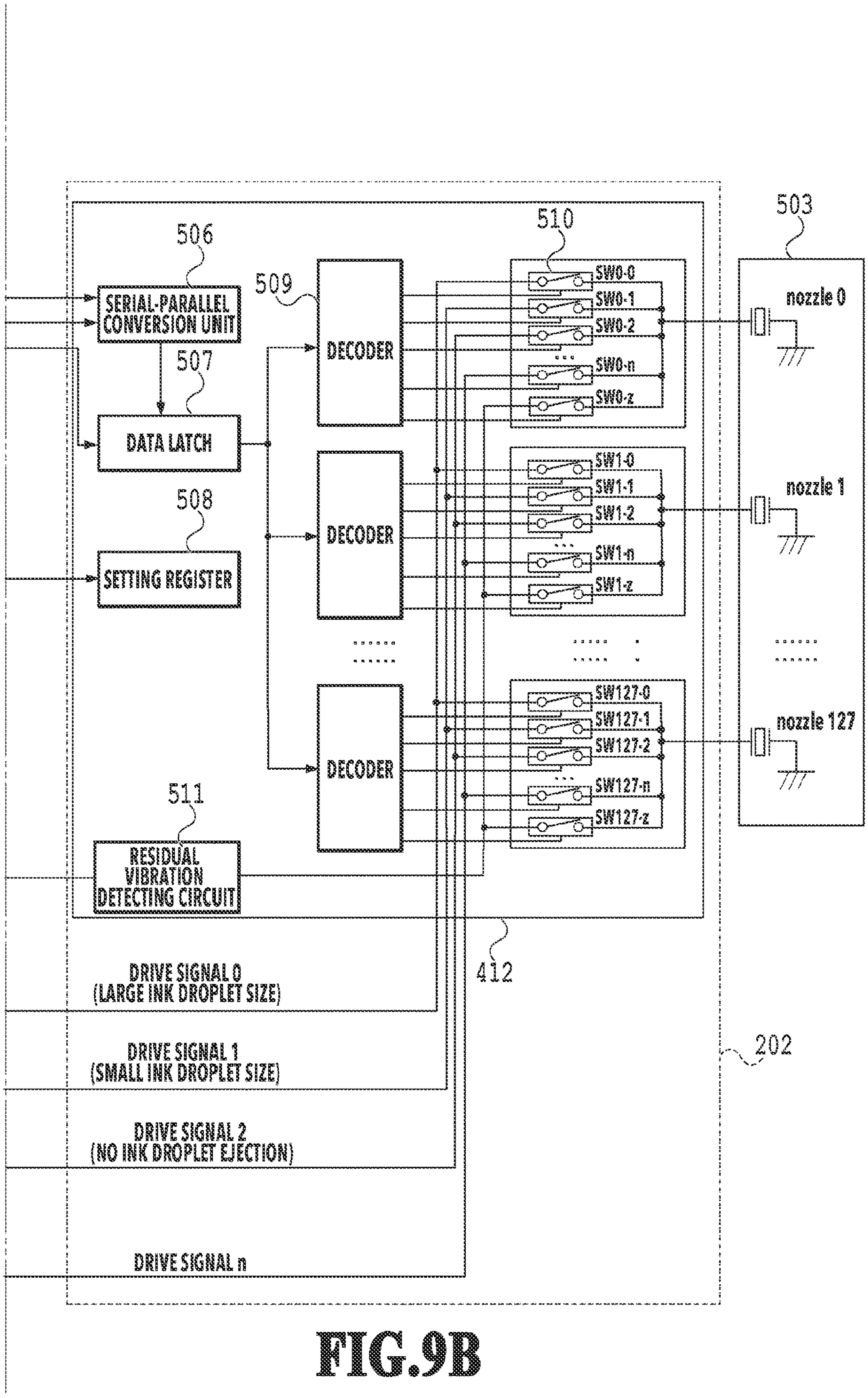

Regarding switches SWx-0 to SWx-n (where each of x and n is an integer in a range from 0 to 127 in the present embodiment) out of the switches included in the switch group 510 shown in FIGS. 9A and 9B, these are switches for supplying the drive signals to the piezoelectric elements 301 corresponding to nozzles x.

Meanwhile, regarding switches SWx-z (where x is an integer in the range from 0 to 127 in the present embodiment), these are switches for supplying a residual vibration voltage, which is generated in each piezoelectric element 301 due to residual vibration generated after driving the piezoelectric element 301, to a residual vibration detecting circuit 511.

Figure 12:
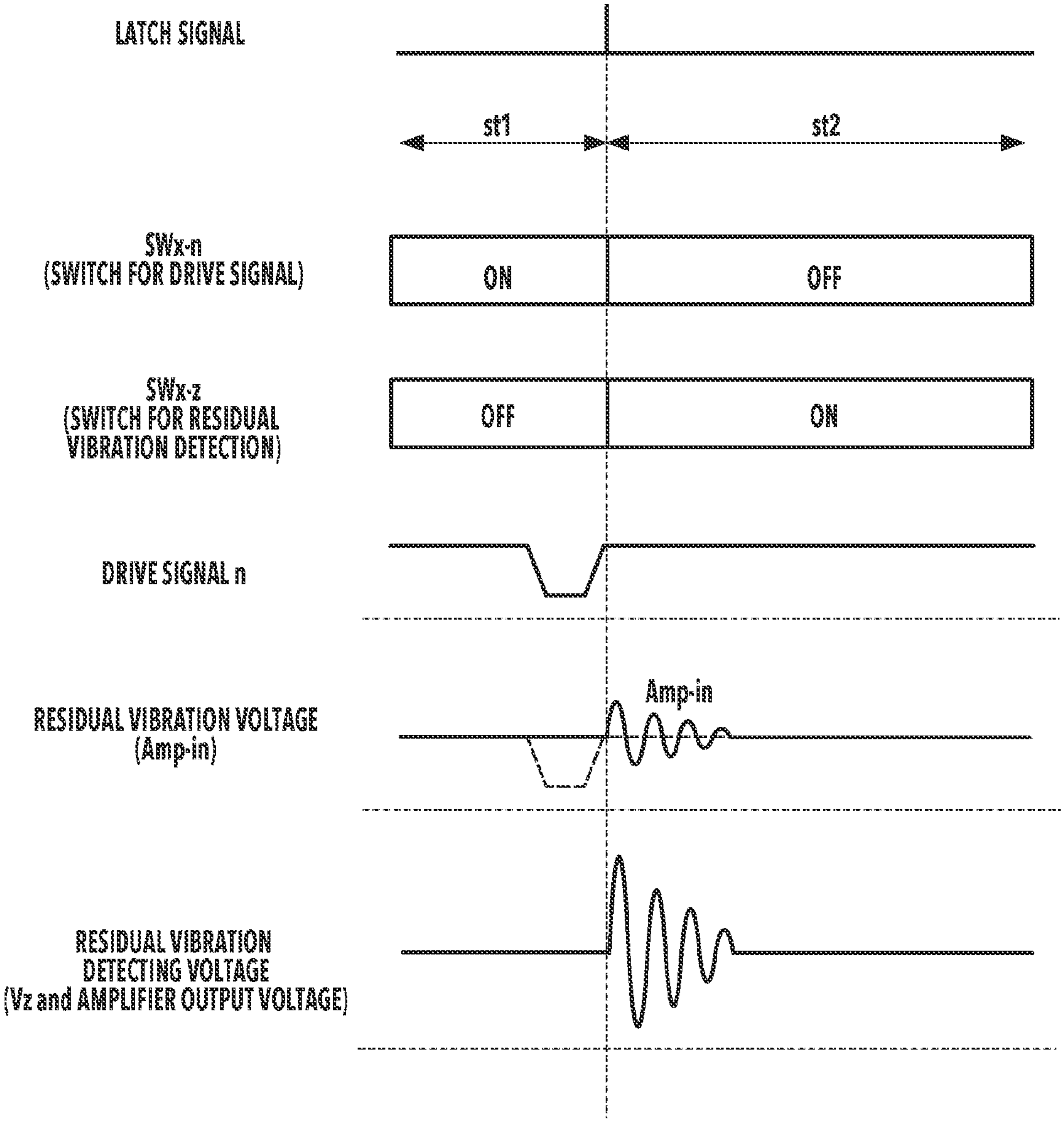
FIG. 12 is a diagram showing a residual vibration voltage.

As shown in FIG. 12, the drive signal is first applied to the piezoelectric element 301 in an interval st1, thereby driving the piezoelectric element 301. Then, the switch is turned off to stop application of the drive signal to the piezoelectric element 301. Then, a voltage Amp-in emerges in the piezoelectric element 301 in an interval st2 as shown in FIG. 12. This voltage is formed by converting mechanical vibration that remains in the piezoelectric element 301 into the voltage as a consequence of a piezoelectric effect, and is called a "residual vibration voltage". An abnormality of each nozzle can be detected by detecting and analyzing the residual vibration voltage.

Figure 13:
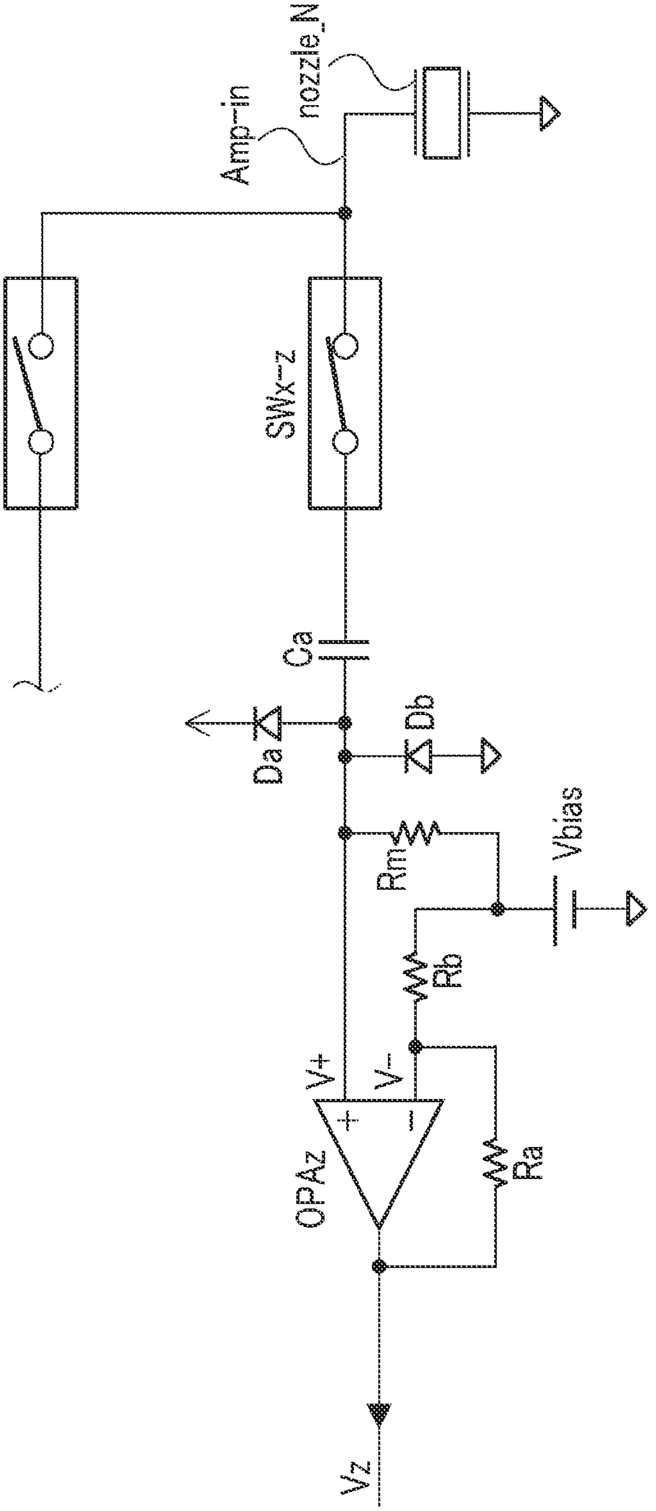
FIG. 13 is a diagram showing a residual vibration detecting circuit.

Detection of the residual vibration to be executed by the residual vibration detecting circuit 511 in FIGS. 9A and 9B will be described with reference to FIG. 13.

The residual vibration voltage Amp-in is supplied to a non-inverting input terminal V+ of an operational amplifier OPAz through a switch SWx-z and a capacitor Ca. Meanwhile, the non-inverting input terminal V+ of the operational amplifier OPAz is connected to a bias voltage Vbias through a resistor Rm. On the other hand, an inverting input terminal V− of the operational amplifier OPAz is connected to the bias voltage Vbias through a resistor Rb. Meanwhile, the inverting input terminal V− of the operational amplifier OPAz is connected to an output terminal of the operational amplifier OPAz through a resistor Ra.

In the above-described circuit, the residual vibration voltage Amp-in is amplified to a residual vibration detecting voltage Vz. The residual vibration detecting voltage Vz is expressed by the following formula (1).

$$Vz=R_a+R_b/R_b+\mathrm{Amp}_{-in}+V_{bias} \quad \text{Formula (1)}$$

The residual vibration detecting voltage Vz is sent out of the residual vibration detecting circuit 511. Thereafter, the residual vibration detecting voltage Vz is converted into a digital signal by an analog-digital conversion device 237 (see FIGS. 9A and 9B), and is analyzed by a not-illustrated logical operation element.

<Drive Signal Generation Circuit>

Figure 14:
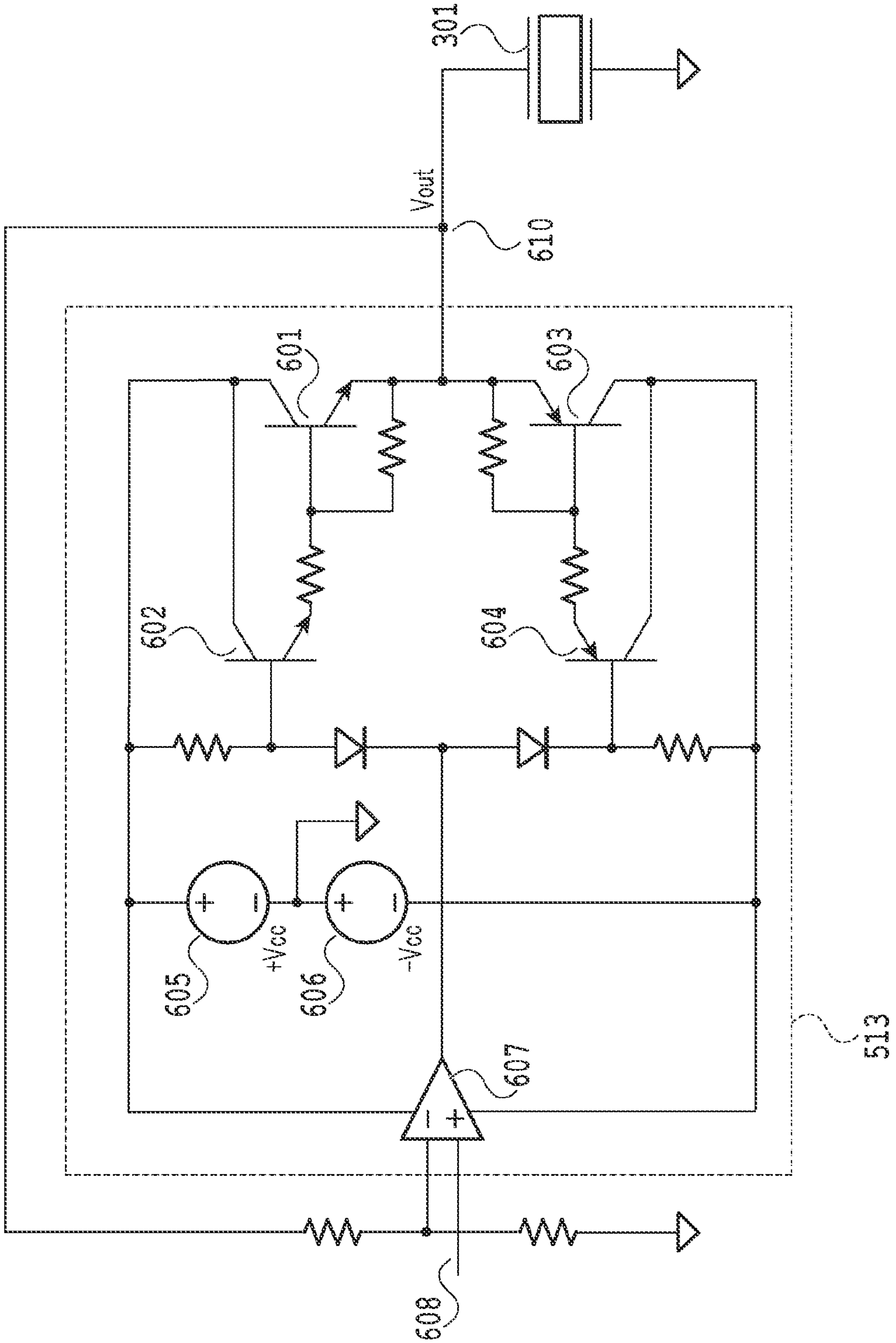
FIG. 14 is a diagram showing a drive signal generation circuit for ink ejection.

The drive signal generation circuit 513 shown in FIGS. 9A and 9B will be described with reference to FIG. 14. FIG. 14 is a circuit diagram of the drive signal generation circuit 513. The drive signal generation circuit 513 is so-called an amplifier circuit configured to amplify a voltage and a current of an analog signal 608 supplied to a non-inverting input terminal V+ of an operational amplifier 607.

As shown in FIG. 14, the drive signal generation circuit 513 is formed from a transistor a transistor 601 and a transistor 602 which are Darlington-connected on a high side, a transistor 603 and a transistor 604 which are Darlington-connected on a low side, and the operational amplifier 607. Each of the transistor 601 and the transistor 602 is an npn transistor while each of the transistor 603 and the transistor 604 is a pnp transistor.

Each of a base terminal of the transistor 602 and a base terminal of the transistor 604 is connected to an output terminal of the operational amplifier 607 through a diode. Each of an emitter terminal of the transistor 601 and an emitter terminal of the transistor 603 is connected to the piezoelectric element 301 through a not-illustrated switch SWx-n.

In a case where the analog signal 608 is inputted to the drive signal generation circuit 513 in the above-described configuration, the voltage of the analog signal 608 is amplified by the operational amplifier 607. Next, the current is amplified by the transistors 601 and 602 as well as the transistors 603 and 604.

Finally, the piezoelectric element 301 is driven by a drive signal 610 with the amplified voltage and the amplified current, and the ink is ejected accordingly.

Embodiment 11

<Configuration of Premises>

Now, premises of Embodiment 1 will be described. As mentioned above, FIG. 3 is the schematic diagram of the print head 101. Meanwhile, FIG. 4 shows the lines on the first layer of the flexible electric wiring board 210 and FIG. 5 shows the lines on the second layer of the flexible electric wiring board 210. These drawings are wiring diagrams of the respective layers in the flexible electric wiring board in the case where line widths of the respective drive signal lines are set equal.

As shown in FIG. 3, the present embodiment is designed to arrange the two chip units 209. Accordingly, there is a limitation in the width of the flexible electric wiring board. Moreover, it is also necessary to provide a space between the two chip unit 209 in order to deploy ink flow channel members and a cooling mechanism, which are not illustrated therein. To this end, the flexible electric wiring board 210 adopts a mode of reducing a width of an upper part as compared to that of a lower part as shown in FIG. 4 or FIG. 5.

Since the necessary number of the drive signal lines and the like need to be deployed within the width of the flexible electric wiring board 210, the present embodiments sets the line width of each drive signal line relatively to a small value as indicated below. Here, the small width of the drive signal line increases line resistance. As a consequence, the drive signal lines may generate heat in the case where a large current is applied thereto. In order to suppress the heat generation, it is necessary to limit a maximum current value to be fed to each drive signal line. Accordingly, the number of nozzles to be simultaneously driven may be limited depending on the drive signal lines.

<Structure of Flexible Electric Wiring Board>

Figure 15:
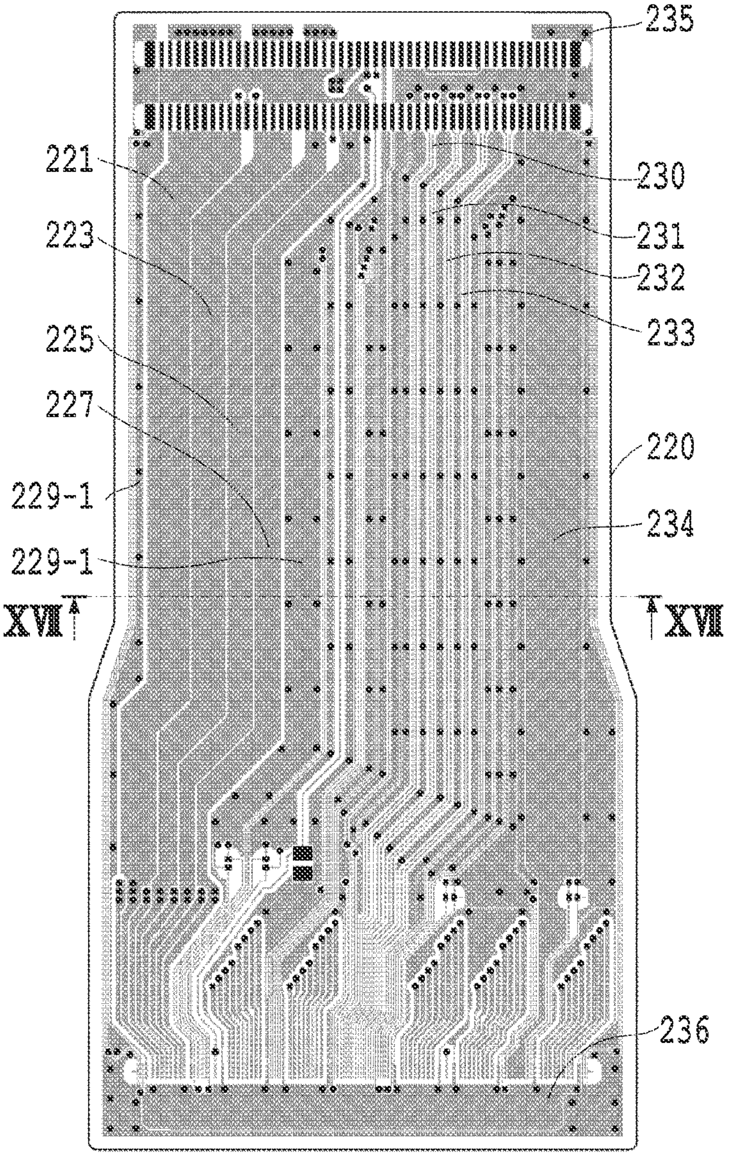
FIG. 15 is a schematic diagram of a flexible electric wiring board.
Figure 16:
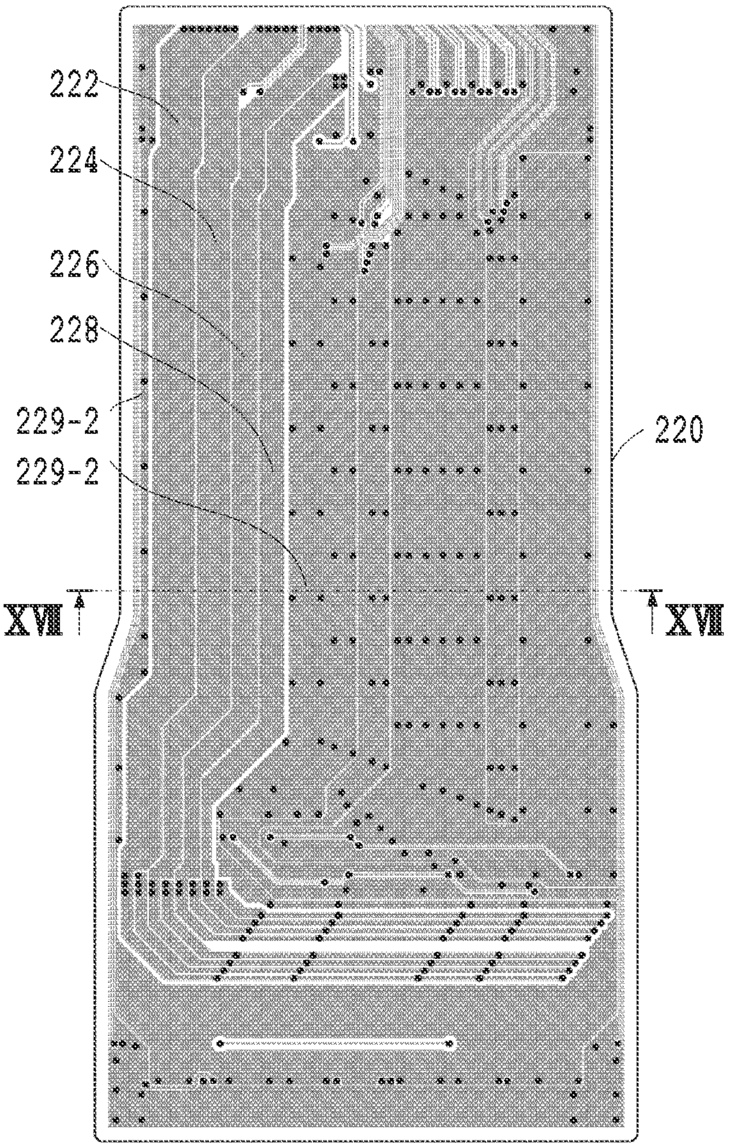
FIG. 16 is another schematic diagram of the flexible electric wiring board.

A flexible electric wiring board according to the present embodiment will be described below with reference to FIGS. 15 and 16. FIG. 15 shows lines on a first layer of a flexible electric wiring board 220 of the present embodiment. FIG. 16 shows lines on a second layer of the flexible electric wiring board 220 of the present embodiment, which is seen through the first layer side. A laminated structure of the flexible electric wiring board 220 is formed from the first layer and the second layer.

A first drive signal line 221 that is capable of dealing with a drive current (in other words, capable of feeding such a current) at the time of simultaneously driving all (100%) of the nozzles (or the piezoelectric elements corresponding to the nozzles) constituting a predetermined drive unit (1 column) is deployed on the first layer in FIG. 15. Meanwhile, a second drive signal line 223 that is capable of dealing with a drive current for simultaneously driving 75% out of all of the piezoelectric elements is deployed on the first layer. Likewise, a third drive signal line 225 that is capable of dealing with a drive current for simultaneously driving 50% out of all of the piezoelectric elements is deployed thereon, and a fourth drive signal line 227 that is capable of dealing with a drive current for simultaneously driving 33% out of all of the piezoelectric elements is deployed thereon. Here, as an index for representing the maximum number of the piezoelectric elements that can be driven simultaneously, a situation to simultaneously drive prescribed percentage n % of the piezoelectric elements will be expressed as "at the time of driving n %", as typified by an expression "at the time of driving 100%" in order to represent the case of simultaneously driving all of the piezoelectric elements that correspond to all of the nozzles included in the predetermined drive unit (such as a row of the nozzles).

Drive signal feedback current lines 229-1 are return paths for the drive signals and are capable of dealing with a feedback current of the drive signals at the time of driving 100%. As for other configurations, there is provided a mounting unit 236 for mounting the drive signal selection unit for selectively switching the drive signals to be applied to the piezoelectric elements as shown in FIG. 15. In addition, a first control signal line 231, a second control signal line 232, and a third control signal line 233 for transmitting controls signals to drive the drive signal selection unit as well as a synchronization signal line 230 are provided therein. Moreover, a power supply line for supplying drive power to the drive signal selection unit, a bypass capacitor for a power supply, a connector 235 to establish connection to a head board that is connected to a printing apparatus body, a residual vibration signal line 234 to transmit the residual vibration of the piezoelectric elements to the body, and a reference voltage line fixed to a constant voltage are deployed thereon.

A first drive signal line 222 that is capable of dealing with a drive current (in other words, capable of feeding such a current) at the time of simultaneously driving all (100%) of the piezoelectric elements is deployed on the second layer shown in FIG. 16. Meanwhile, a second drive signal line 224 that is capable of dealing with a drive current for simultaneously driving 75% out of all of the piezoelectric elements is deployed on the second layer. Likewise, a third drive signal line 226 that is capable of dealing with a drive current for simultaneously driving 50% out of all of the piezoelectric elements is deployed thereon, and a fourth drive signal line 228 that is capable of dealing with a drive current for simultaneously driving 33% out of all of the piezoelectric elements is deployed thereon. Moreover, drive signal feedback current lines 229-2 that can deal with a feedback current of the drive signals at the time of driving 100%, a reference voltage line fixed to a constant voltage, and the like are deployed on the second layer.

The description of the first to fourth drive signal lines on the first layer, the first to fourth drive signal lines on the second layer, and the like has been made above for the sake of convenience. However, these drive signal lines are different from one another, and may therefore be referred to as first to eighth drive signal lines in the flexible electric wiring board instead.

The drive signal lines on the first layer and the drive signal lines on the second layer are disposed such that the corresponding drive signal lines overlap one another so as to suppress adverse effects on the control signals. In both of the first layer and the second layer, the drive signal feedback current lines 229 (the drive signal feedback current lines 229-1 or the drive signal feedback current lines 229-2) are disposed on an opposite side from the third drive signal line with respect to the first drive signal line, or on an opposite side from the third drive signal line with respect to the fourth drive signal line. This is aimed at keeping effects such as electromagnetic induction based on voltage variations on the drive signal lines from affecting other control signal lines and the like.

As for the line widths of the respective drive signal lines, a width corresponding to the maximum number of elements that can be driven simultaneously only needs to be arranged. In general, in the case of feeding a current at 1 A to a copper foil having a thickness of 35 μm, a required line width is 1 mm in order to hold the heat generation in the lines within several degrees centigrade. Here, it is known that the value of the current is proportional to the line width.

For example, in the case where the thickness of the copper foil of the flexible electric wiring board 220 is equal to 35 μm, a line width of 2 mm is required for the drive signal line on the assumption that the current flowing on the drive signal line in the case of simultaneously driving 100% of the piezoelectric elements is set to 2 A. Likewise, a line width of 1.5 mm is required for the drive signal line on the assumption that the current flowing on the drive signal line in the case of simultaneously driving 75% of the piezoelectric elements is set to 1.5 A. Similarly, a line width of 1.0 mm is required for the drive signal line on the assumption that the current flowing on the drive signal line in the case of simultaneously driving 50% of the piezoelectric elements is set to 1.0 A. Likewise, a line width of 0.66 mm is required for the drive signal line on the assumption that the current flowing on the drive signal line in the case of simultaneously driving 33% of the piezoelectric elements is set to 0.66 A. In this instance, a sum of the line widths of the above-mentioned drive signal lines is equal to 5.16 mm. In contrast, in a case where the number for constantly dealing with 100% of the piezoelectric elements is assumed to be the number of the elements that can be driven simultaneously, a sum of the line widths of the drive signal lines is equal to 8.0 mm (=2.0 mm×4 lines). Accordingly, it is possible to reduce the width equivalent to 3 mm. Here, each of the drive signal lines is provided as a single thick line instead of multiple thin lines in the present embodiment because clearances are required between the lines in the case of the multiple thin lines.

Incidentally, as for the line width of the drive signal feedback current lines 229, the line width only needs to be a width such as 2 mm, with which each drive signal feedback current line can deal with a maximum current value in the case of driving 100% of the piezoelectric elements, because there is no way to simultaneously drive the piezoelectric elements in excess of 100%. Nonetheless, a total value of the line widths of the multiple drive signal feedback current lines provided on the first layer or the second layer may be larger than 2 mm in the case where the width of the flexible electric wiring board has plenty of room.

The reference voltage lines should be deployed as much as possible for the lines on the second layer that overlap the control signal lines, the power supply line, and the like on the first layer such that the reference voltage lines serve as return paths for those lines. The input of drive signals to the drive signal selection unit is realized by dividing the input into multiple locations such as six locations. This arrangement is made because the input to the drive signal selection unit at a single location may possibly develop a voltage drop due to wiring resistance and the like in the drive signal selection unit in the case of the flow of the maximum current.

Figure 17:
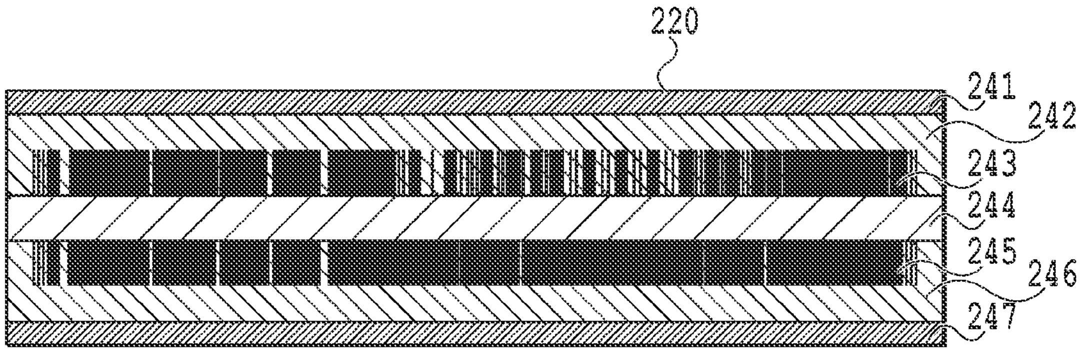
FIG. 17 is a schematic diagram of a cross-section of the flexible electric wiring board.

FIG. 17 schematically shows a cross-section of the flexible electric wiring board 220 formed from the first layer (FIG. 15) and the second layer (FIG. 16), which is the cross-section taken along the XVII-XVII sectional line in FIG. 15 or 16. Upper lines 243 are disposed on an upper surface of a base film 244 while lower lines 245 are disposed on a lower surface of the base film 244. An upper coverlay 241 is attached by using an upper adhesive 242, while a lower coverlay 247 is attached by using a lower adhesive 246. Although FIG. 17 illustrates a case of two-layer wiring, a single-layer wiring structure or a multilayer wiring structure including three or more layers may be adopted depending on the number of signal lines.

Next, a method of selecting the drive signal will be described with reference to FIGS. 15 and 16. Here, a case of driving the piezoelectric elements by using a drive signal selected from eight types of drive signals will be discussed as an example. For instance, the first drive signal line 221 on the first layer or the first drive signal line 222 on the second layer, each of which is capable of driving 100% of the piezoelectric elements, may be selected in the case of driving 100% of the piezoelectric elements by using one type of the drive signal only.

Alternatively, one type of the drive signal may be allocated to two or more first drive signal lines. In this instance, a combination of the third drive signal line 225 on the first layer and the third drive signal line 226 on the second layer may be used as the drive signal lines for driving 50% of the piezoelectric elements. Meanwhile, a combination of the second drive signal line 223 on the first layer and the second drive signal line 224 on the second layer may be used as the drive signal lines for driving 75% of the piezoelectric elements. In the meantime, a combination of the second drive signal line 223 on the first layer for driving 75% of the piezoelectric elements and the third drive signal line 225 on the first layer for driving 50% of the piezoelectric elements may be used. As described above, the drive signal line that allows the maximum current value of the drive signal, or a combination of such drive signal lines is selected as appropriate.

The same applies to a case of using two types of the drive signals, for example. The drive signal line that allows the maximum current value of the drive signal is selected for each of the two types of the drive signals, respectively. For instance, 75% of the piezoelectric elements are assumed to be driven by one of the drive signals and the remaining 25% of the piezoelectric elements are assumed to be driven by the remaining drive signal. In this case, the second drive signal line 223 on the first layer or the second drive signal line 224 on the second layer is selected for 75% of the piezoelectric elements. Meanwhile, for the remaining 25% of the piezoelectric elements, the fourth drive signal line 227 on the first layer or the fourth drive signal line 228 on the second layer is selected as the drive signal line that can deal with the current for simultaneously driving 33% of the piezoelectric elements out of all of the piezoelectric elements. Alternatively, a combination of the second drive signal line 223 on the first layer and the second drive signal line 224 on the second layer or a combination of the second drive signal line (223 or 224) and the third drive signal line (225 or 226) is also acceptable.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, it is possible to reduce a width of a flexible electric wiring board and to downsize a print head.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-056136, filed Mar. 30, 2022, which is hereby incorporated by reference herein in its entirety.

What is claimed is:

1. A flexible electric wiring board comprising:

a selection unit configured to select one type of a drive signal out of a plurality of types of drive signals for driving a piezoelectric element;

a plurality of drive signal lines to transmit the plurality of types of the drive signals to the selection unit, respectively; and a control signal line configured to transmit a control signal to the selection unit in order to select the one type of the drive signal, wherein each of the plurality of drive signal lines are provided on a single layer of the flexible electric wiring board, the plurality of drive signal lines are the only drive signal lines on the single layer connected to the selection unit, and a line width of each of the plurality of drive signal lines at a given cross-section is different from a line width of each of the other drive signal lines of the plurality of drive signal lines at the given cross-section.

2. The flexible electric wiring board according to claim 1, wherein the plurality of the drive signal lines have respective line widths that enable the drive signal lines to feed a current necessary for driving maximum numbers of the piezoelectric elements to be simultaneously driven by any of the plurality of types of the drive signals corresponding to the respective drive signal lines.

3. The flexible electric wiring board according to claim 2, wherein a drive signal line having a line width based on the maximum number is selected from the plurality of the drive signal lines for each of the plurality of types of the drive signals.

4. The flexible electric wiring board according to claim 3, wherein a single drive signal line is selected for each of the plurality of types of the drive signals.

5. The flexible electric wiring board according to claim 3, wherein two or more of the drive signal lines are selected for each of the plurality of types of the drive signals.

6. The flexible electric wiring board according to claim 3, wherein the drive signal line is selected in each driving period.

7. The flexible electric wiring board according to claim 3, wherein values of 100%, 75%, 50%, and 33% are adopted as indices of the maximum numbers in a case in which all of a plurality of the piezoelectric elements included in a predetermined drive unit is defined as 100%.

8. The flexible electric wiring board according to claim 1, wherein four values are adopted as values of the respective line widths of the plurality of the drive signal lines.

9. The flexible electric wiring board according to claim 1, wherein the plurality of the drive signal lines establish connection between a generation unit configured to generate the plurality of types of the drive signals and the selection unit.

10. The flexible electric wiring board according to claim 1, further comprising:

a single-layer wiring structure.

11. The flexible electric wiring board according to claim 1, further comprising:

a multilayer wiring structure.

12. The flexible electric wiring board according to claim 1, further comprising:

a power supply line configured to supply power to drive the selection unit.

13. A print head comprising:

a flexible electric wiring board comprising:

a selection unit configured to select one type of a drive signal out of a plurality of types of drive signals for driving a piezoelectric element;

a plurality of drive signal lines to transmit the plurality of types of the drive signals to the selection unit, respectively; and a control signal line configured to transmit a control signal to the selection unit in order to select the one type of the drive signal, wherein each of the plurality of drive signal lines are provided on a single layer of the flexible electric wiring board, the plurality of drive signal lines are the only drive signal lines on the single layer connected to the selection unit, and a line width of each of the plurality of drive signal lines at a given cross-section is different from a line width of each of the other drive signal lines of the plurality of drive signal lines at the given cross-section.

* * * * *